(12) United States Patent
Yoshida et al.

(10) Patent No.: US 10,693,410 B2
(45) Date of Patent: Jun. 23, 2020

(54) CONTROL METHOD AND CONTROL DEVICE FOR ROTARY ELECTRIC MOTOR, AND ROTARY ELECTRIC MOTOR DRIVE SYSTEM

(71) Applicant: Hitachi Automotive Systems, Ltd., Hitachinaka-shi, Ibaraki (JP)

(72) Inventors: Takeshi Yoshida, Hitachinaka (JP); Takafumi Hara, Tokyo (JP); Katsuhiro Hoshino, Hitachinaka (JP); Kazuto Oyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/327,070

(22) PCT Filed: Jul. 12, 2017

(86) PCT No.: PCT/JP2017/025353
§ 371 (c)(1),
(2) Date: Feb. 21, 2019

(87) PCT Pub. No.: WO2018/042895
PCT Pub. Date: Mar. 8, 2018

(65) Prior Publication Data
US 2019/0222160 A1  Jul. 18, 2019

(30) Foreign Application Priority Data

Sep. 5, 2016  (JP) .................................. 2016-172498

(51) Int. Cl.
*H02P 27/08* (2006.01)
*H02P 23/04* (2006.01)
(Continued)

(52) U.S. Cl.
CPC ............ *H02P 27/085* (2013.01); *B60L 50/51* (2019.02); *H02M 7/48* (2013.01); *H02P 23/04* (2013.01); *H02P 27/08* (2013.01); *B60L 9/18* (2013.01)

(58) Field of Classification Search
USPC ................................................ 318/599, 606
See application file for complete search history.

(56) References Cited

U.S. PATENT DOCUMENTS 5,608,640 A * 3/1997 Itoh ...................... G05B 19/231
700/188
2002/0000783 A1* 1/2002 Maceratini ............ H02P 21/141
318/727

(Continued)

FOREIGN PATENT DOCUMENTS

CN       103633917 A     3/2014
JP       2002-325472 A   11/2002
JP       2007-20246 A    1/2007

OTHER PUBLICATIONS

International Search Report (PCT/ISA/210) issued in PCT Application No. PCT/JP2017/025353 dated Oct. 31, 2017 with English translation (three (3) pages).

(Continued)

*Primary Examiner* — Bentsu Ro
(74) *Attorney, Agent, or Firm* — Crowell & Moring LLP

(57) ABSTRACT

A control device and a control method for a rotary electric motor, and a rotary electric motor drive system capable of reliably suppressing vibration of the rotary electric motor are provided. A rotary electric motor is controlled by PWM at a predetermined carrier frequency, and in a case where a vibration frequency in a space zero-order eigenmode of the rotary electric motor and a frequency of a frequency component of electromagnetic exciting force that generates the eigenmode overlap with each other, a value of the carrier (Continued)

frequency is switched from a first value to a second value different from the first value.

10 Claims, 12 Drawing Sheets

(51) Int. Cl.
    *H02M 7/48*       (2007.01)
    *B60L 50/51*      (2019.01)
    *B60L 9/18*       (2006.01)

(56) References Cited

U.S. PATENT DOCUMENTS

2011/0181210 A1*   7/2011   Murata ................ H02P 25/034
                                                                                    318/128
2015/0127202 A1*   5/2015   Itou ........................ B60L 15/20
                                                                                    701/22

OTHER PUBLICATIONS

Japanese-language Written Opinion (PCT/ISA/237) issued in PCT Application No. PCT/JP2017/025353 dated Oct. 31, 2017 (four (4) pages).

\* cited by examiner

NUMBER OF SLOTS: 12
NUMBER OF POLES: FOUR POLES (TWO POLE PAIRS)

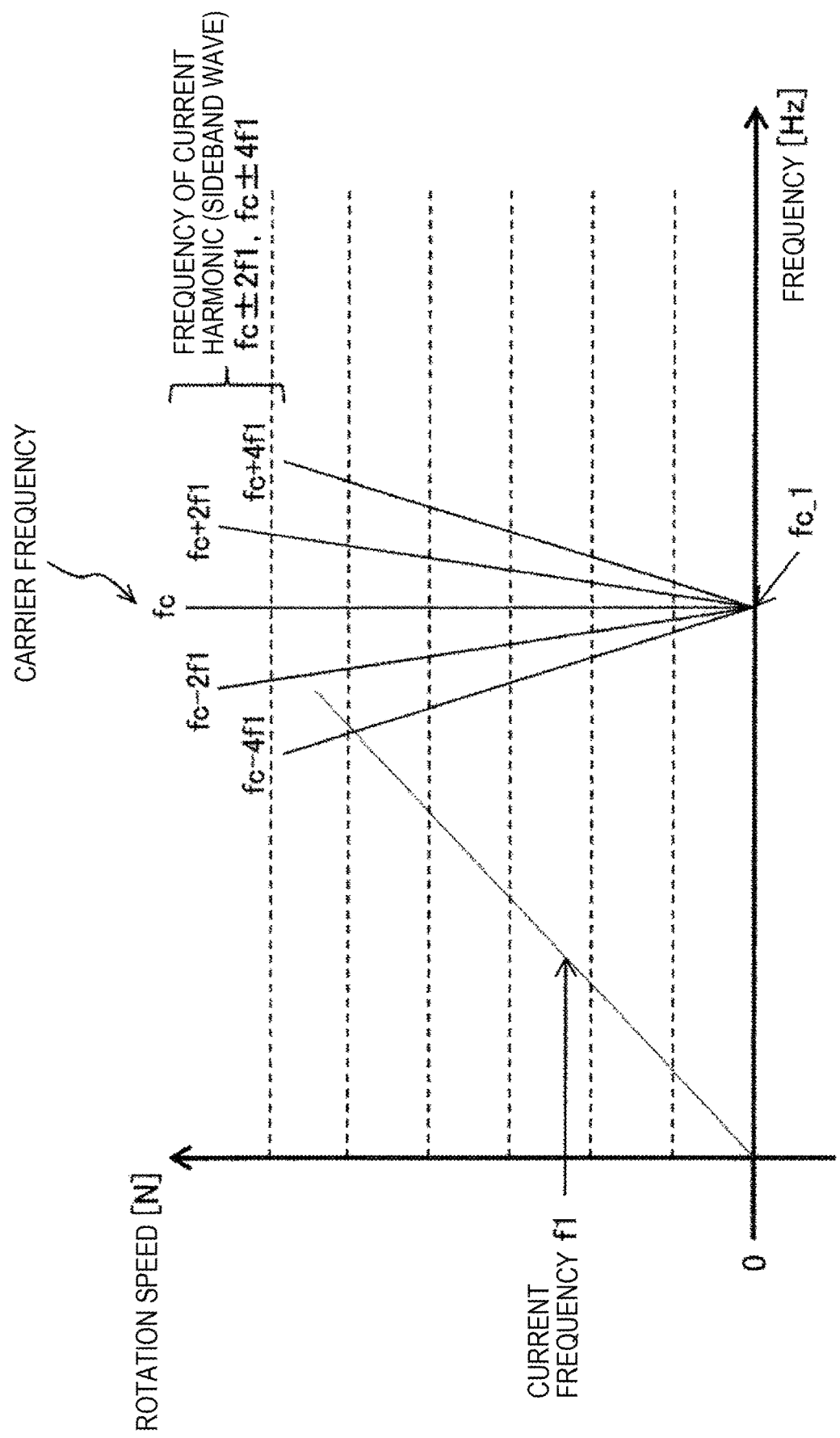

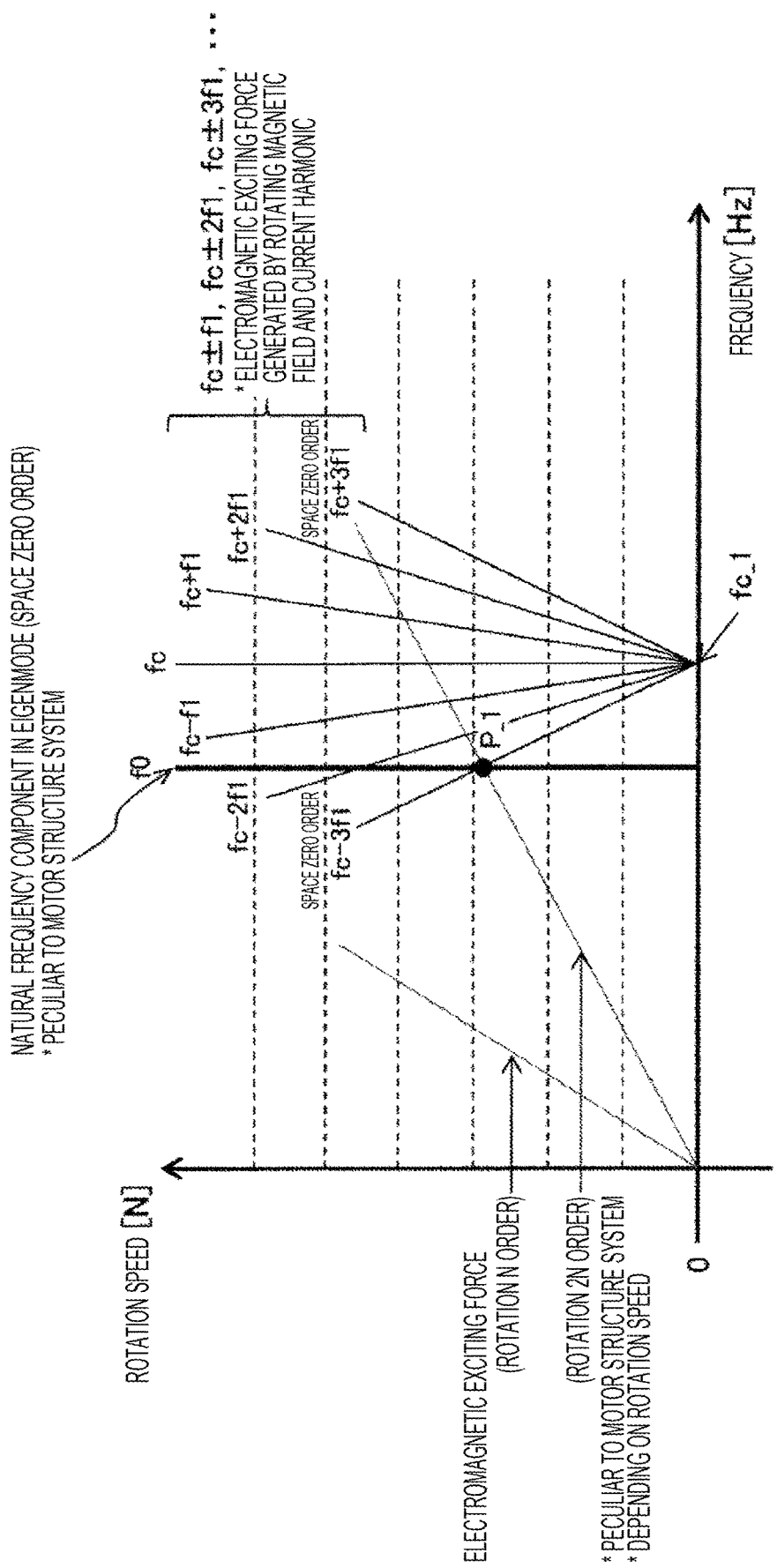

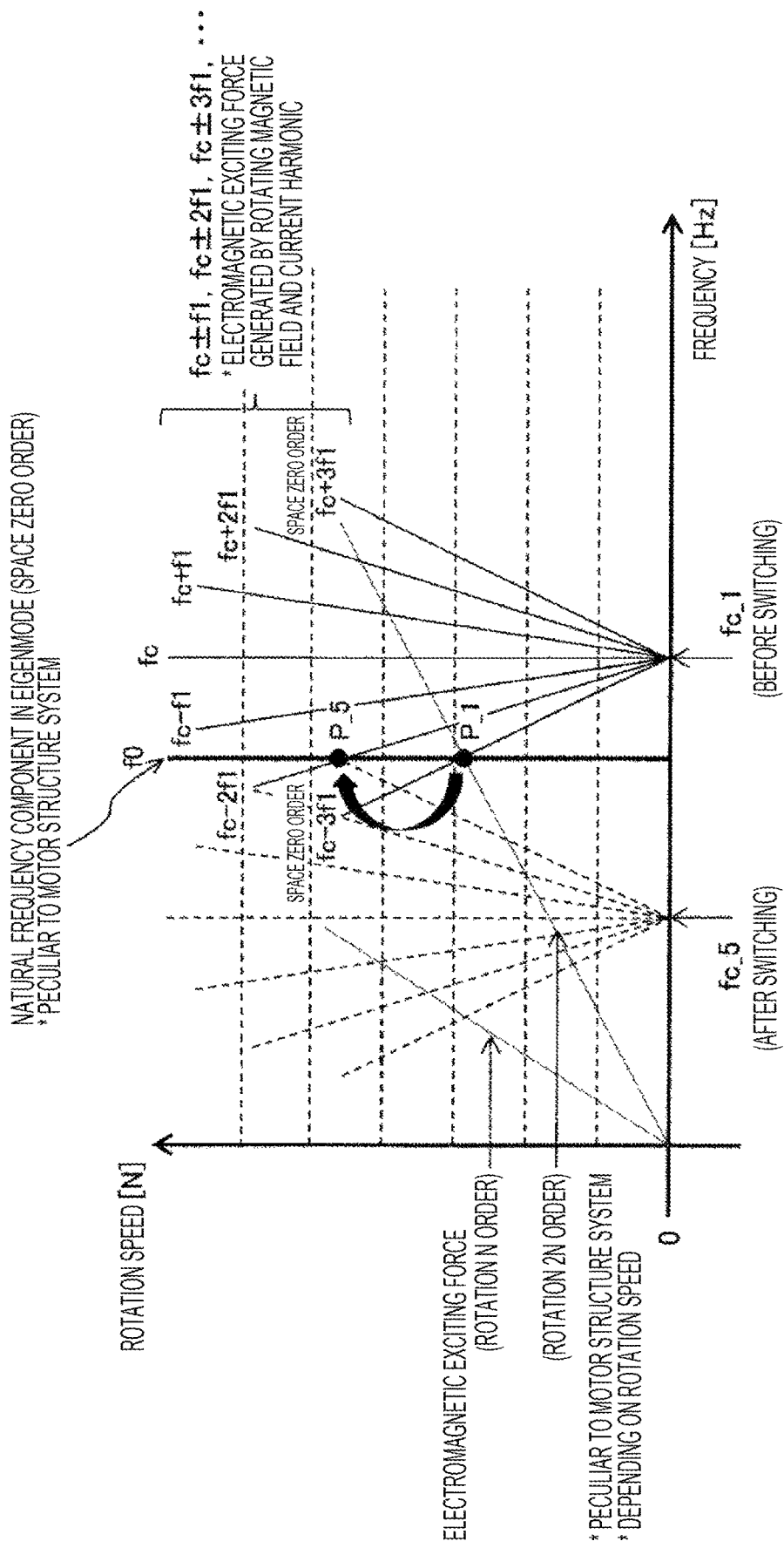

CONTROL METHOD AND CONTROL DEVICE FOR ROTARY ELECTRIC MOTOR, AND ROTARY ELECTRIC MOTOR DRIVE SYSTEM

TECHNICAL FIELD

The present invention relates to a control device and a control method for a rotary electric motor, and a rotary electric motor drive system.

BACKGROUND ART

Rotary electric motors such as permanent magnet motors have eigenmodes of mechanical vibration depending on mechanical structures of a rotor, a stator, and a housing. Further, electromagnetic exciting force is generated due to variation of magnetic force between the rotor and the stator with rotation of the rotary electric motor. When a frequency in the eigenmode and a frequency of the electromagnetic exciting force overlap and resonance occurs, large vibration occurs in the rotary electric motor. Such vibration of the rotary electric motor causes noise and causes deterioration of comfortability of a user.

As a conventional technology for suppressing occurrence of vibration in a rotary electric motor, the technology described in PTL 1 is known. In the present technology, a resonance frequency is calculated on the basis of a switching frequency of an inverter and a rotation frequency of a permanent magnet motor, and whether the calculated resonance frequency and a natural vibration frequency of the permanent magnet motor coincide with each other is determined. When it is determined that the resonance frequency and the natural vibration frequency coincide with each other, the switching frequency of the inverter is shifted to avoid occurrence of resonance.

CITATION LIST

Patent Literature

PTL 1: JP 2007-20246 A

SUMMARY OF INVENTION

Technical Problem

In the above-described conventional technology, vibration generated by the electromagnetic exciting force caused by structures of a magnetic pole in the rotor, a teeth portion to which winding is applied in the stator, and the like can be suppressed. However, the above-described conventional technology does not consider the electromagnetic exciting force caused by a harmonic component of a current flowing through the rotary electric motor. For this reason, reliable suppression of the vibration of the rotary electric motor is difficult, and large vibration may occur.

Therefore, the present invention provides a control method and a control device for a rotary electric motor capable of reliably suppressing vibration of the rotary electric motor, and a rotary electric motor drive system.

Solution to Problem

To solve the above-described problem, a rotary electric motor control method according to the present invention is a method for controlling a rotary electric motor by PWM at a predetermined carrier frequency, the method including, in a case where a vibration frequency in a space zero-order eigenmode of the rotary electric motor and a frequency of a frequency component of electromagnetic exciting force that generates the eigenmode overlap with each other, switching a value of the carrier frequency from a first value to a second value different from the first value.

Further, to solve the above-described problem, a rotary electric motor control device according to the present invention controls a rotary electric motor by PWM at a predetermined carrier frequency, the device including a power module configured to output three-phase alternating current power for driving the rotary electric motor by ON/OFF of a semiconductor switching element, a drive circuit configured to create a PWM gate pulse for turning ON/OFF the semiconductor switching element, and an arithmetic control device configured to create a gate drive signal commanding creation of the PWM gate pulse to the drive circuit by PWM with the predetermined carrier frequency, in which the arithmetic control device determines whether a vibration frequency in a space zero-order eigenmode of the rotary electric motor and a frequency of a frequency component of electromagnetic exciting force that generates the eigenmode overlap with each other, and switches a value of the carrier frequency from a first value to a second value different from the first value in a case where the overlap is determined.

Further, to solve the above-described problem, a rotary electric motor drive system according to the present invention includes a rotary electric motor and an inverter configured to drive the rotary electric motor, in which the inverter consists of the rotary electric motor control device according to the present invention.

Advantageous Effects of Invention

According to the present invention, an overlap of the vibration frequency in the space zero-order eigenmode of the rotary electric motor and the frequency of the frequency component of the electromagnetic exciting force that generates the eigenmode is prevented by the switching of the carrier frequency. As a result, occurrence of the vibration of the motor can be reliably prevented.

Problems, configurations, and effects other than those described above will be clarified by the description of the embodiments below.

BRIEF DESCRIPTION OF DRAWINGS

FIG. 6 illustrates a relationship between frequency components of a motor phase current and a motor rotation speed.

FIG. 7 illustrates a state in which a vibration frequency peculiar to a motor structure and a frequency of electromagnetic exciting force created by a current harmonic and a rotating magnetic field of the motor overlap.

FIG. 8D illustrates means for reducing sound and vibration of the motor in the present embodiment.

DESCRIPTION OF EMBODIMENTS

First, an outline of an embodiment of the present invention will be described.

According to the study by the present inventor, a space zero-order eigenmode (annular mode) in which sound and vibration are more likely to occur, of eigenmodes of vibration of a rotary electric motor (hereinafter described as "motor") is generated by electromagnetic exciting force by a frequency component fc±3f1 (fc: a carrier frequency of an inverter device and f1: a rotation frequency of the motor), of electromagnetic exciting force caused by a carrier.

Further, according to the study by the present inventor, the sound and vibration become large in a case where a point at which a vibration frequency in the space zero-order eigenmode and the frequency fc±3f1 of the electromagnetic exciting force overlap occurs.

Here, the frequency of the space zero-order eigenmode can be predicted or measured on the basis of the structure of the motor. Therefore, in the present embodiment, in the case where the vibration frequency in the space zero-order eigenmode and a frequency fc_a±3f1 of the electromagnetic exciting force overlap when the inverter device drives and controls the motor at a carrier frequency fc_a, and the motor rotates at the rotation frequency f1, the carrier frequency is switched from fc_a to fc_b having different magnitude from the fc_a. As a result, a region where the vibration frequency f0 in the space zero-order eigenmode and the frequency fc_a±3f1 of the electromagnetic exciting force overlap, that is, a region where the sound and vibration become large, is moved to a region where a motor rotation speed is low or a region where a motor rotation speed is high. More specifically, the present embodiment is as follows.

In a case where a region of the motor rotation speed to be used is a high-speed rotation region, the region where the vibration frequency f0 in the space zero-order eigenmode and the frequency component of the electromagnetic exciting force caused by the carrier overlap is moved to a low-speed rotation region of the motor rotation speed.

In a case where the region of the motor rotation speed to be used is the low-speed rotation region, the region where the vibration frequency f0 in the space zero-order eigenmode and the frequency component of the electromagnetic exciting force caused by the carrier overlap is moved to the high-speed rotation region of the motor rotation speed.

In this manner, the sound and vibration generated by the motor can be reduced by moving the region where the vibration frequency in the space zero-order eigenmode and the frequency component of the electromagnetic exciting force caused by the carrier overlap.

Hereinafter, an embodiment of the present invention will be described in detail with reference to the drawings.

Figure 1:
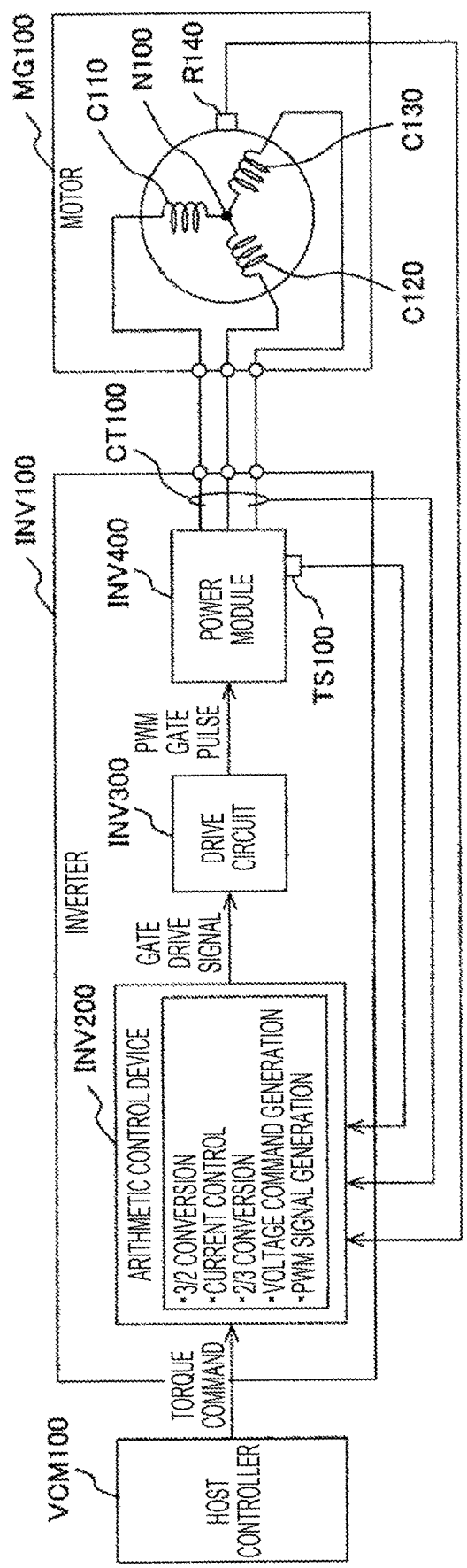
FIG. 1 is a block diagram illustrating a control device for a rotary electric motor according to an embodiment of the present invention, and a drive system including the control device and the motor.

FIG. 1 is a block diagram illustrating a control device for a rotary electric motor (hereinafter referred to as "motor") according to an embodiment of the present invention, and a drive system including the control device and the motor. The motor in the present embodiment is mounted in an electric vehicle or a hybrid vehicle.

A motor MG100 is, for example, a three-phase motor including a Y connection as illustrated in FIG. 1. The motor MG100 includes a U-phase coil winding C110, a V-phase coil winding C120, and a W-phase coil winding C130. The coil windings C110, C120, and C130 are connected at a common neutral point N100. Further, the motor MG100 is provided with a rotation angle sensor R140 for detecting a rotation angle of a motor rotor. Note that, as the motor MG100, a permanent magnet synchronous motor or the like is applied. Further, as the rotation angle sensor R140, an encoder, a resolver, or the like is applied.

The motor MG100 is rotationally driven as a drive current is supplied to the coil windings by an inverter INV100, using a battery (not illustrated) composed of a secondary battery such as a lithium ion battery or a nickel hydrogen battery as a power source.

As will be described below, the inverter INV100 includes an arithmetic control device INV200, a drive circuit INV300, and a power module INV400.

The power module INV400 includes power semiconductor switching elements (hereinafter referred to as "switching elements") that respectively constitute a U-phase arm, a V-phase arm, and a W-phase arm. The power module INV400 converts direct current power of the battery into three-phase alternating current power by controlling on/off timing of the switching elements. A switching operation of the power module INV400, that is, an on/off operation of the switching elements is controlled by a drive signal from the drive circuit INV300. Note that, as the switching element, an insulated gate bipolar transistor (IGBT) or a metal oxide semiconductor field effect transistor (MOSFET) is applied.

The arithmetic control device INV200 generates a gate drive signal (operation command) for controlling the switching timing of the switching elements by pulse width modulation (hereinafter abbreviated as PWM) on the basis of input information from another control device (host controller VCM100), a sensor, or the like. The drive circuit INV300 creates a PWM gate pulse signal on the basis of the gate drive signal and outputs the PWM gate pulse signal to the power module INV400. The arithmetic control device INV200 includes a microcomputer for arithmetically processing the switching timing. The input information to the microcomputer includes a required target torque value, a current value flowing through the motor MG100, a rotation angle signal of the rotor, a temperature of the power module INV400, and the like.

The target torque value (torque command) is input from the host controller VCM100 to the arithmetic control device INV200. As the host controller VCM100, for example, a vehicle controller that controls the entire vehicle corresponds to the host controller VCM100 in a case where the motor MG100 is a motor for vehicle traveling. The current value flowing through the motor MG100 is detected by a current sensor CT100. The rotation angle of the rotor of the motor MG100 is detected by the above-described rotation angle sensor R140, and a detection signal (position information) thereof is transmitted to the inverter INV100. The temperature of the power module INV400 (the temperature in the vicinity of the switching elements) is detected by a temperature sensor TS100.

The arithmetic control device INV200 calculates a current command value of a dq axis of the motor MG100 in a rotation coordinate system on the basis of the target torque value, and calculates a voltage command value of the dq axis on the basis of a difference between the calculated current command value of the dq axis and a detected current value of the dq axis. Further, the arithmetic control device INV200 converts the calculated voltage command value of the dq axis into U-phase, V-phase, and W-phase voltage command values on the basis of the detected rotation angle. Furthermore, the arithmetic control device INV200 generates a pulse-width-modulated pulse signal on the basis of comparison between a fundamental wave (sine wave) based on the U-phase, V-phase, and W-phase voltage command values and a carrier wave (triangular wave), and outputs the generated pulse signal to the drive circuit INV300 as the gate drive signal. The drive circuit INV300 amplifies the gate drive signal to create the PWM gate pulse signal, and outputs the created gate drive signal to the switching elements in the power module INV400. As a result, the switching elements perform the switching operation.

Figure 2:
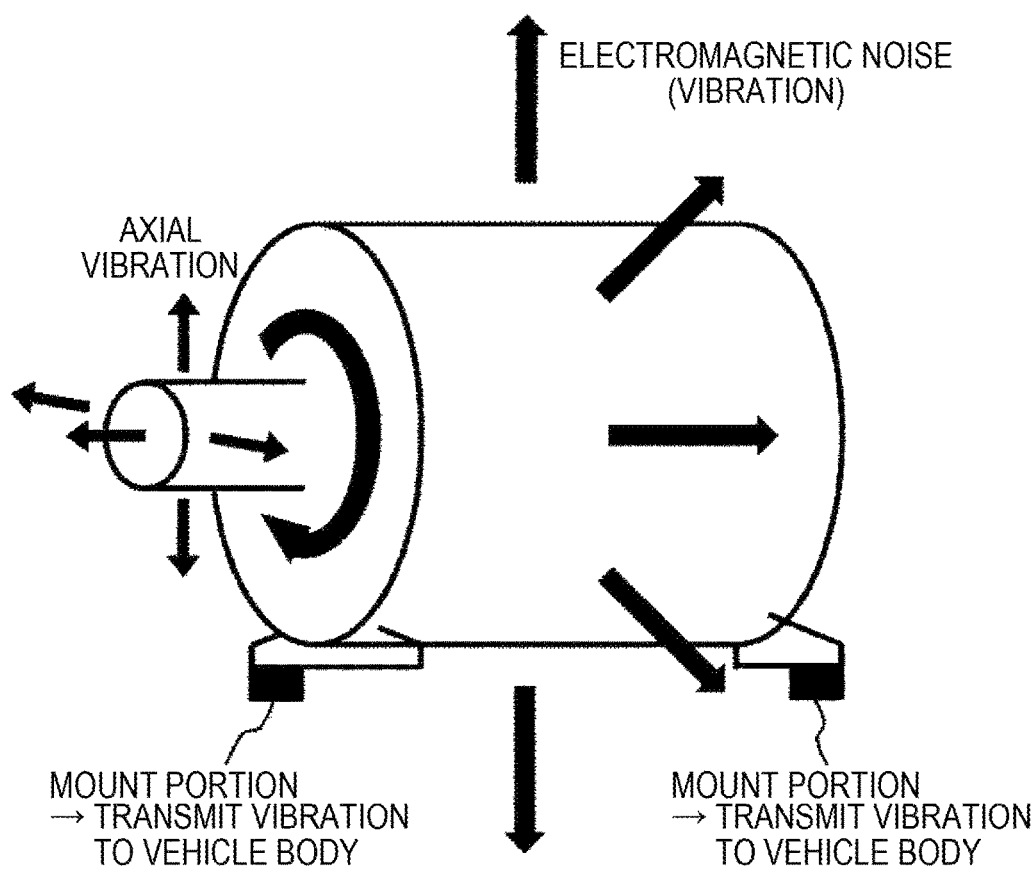
FIG. 2 is a schematic diagram illustrating of occurrence of vibration and a transmission path during motor driving.

FIG. 2 is a schematic diagram illustrating of occurrence of vibration and a transmission path during motor driving.

As illustrated in FIG. 2, axial vibration (in an axial direction or a direction perpendicular to the axial direction) and electromagnetic noise (vibration) in a radial direction of the motor mainly occur in the rotating motor. These vibrations are transmitted through a structure such as a stator and a housing of the motor and are further transmitted to a vehicle body side via a mount portion between the motor and a vehicle body. Therefore, when large vibration occurs in the motor, noise is generated.

The axial vibration occurs by change in gear meshing force of a reduction gear connected to a motor shaft, twisting of a shaft, or the like. Further, the electromagnetic noise (vibration) in the radial direction occurs by exciting force by electromagnetic force and has an eigenmode and a natural frequency peculiar to a motor structure system. Note that the magnitude of the electromagnetic noise (vibration) in the radial direction varies depending on an operating point of the motor.

Here, main causes (1) to (3) related to the occurrence of the sound and vibration during motor driving will be described.

(1) The Eigenmode and the Natural Frequency of the Motor Structure System

Figure 3:
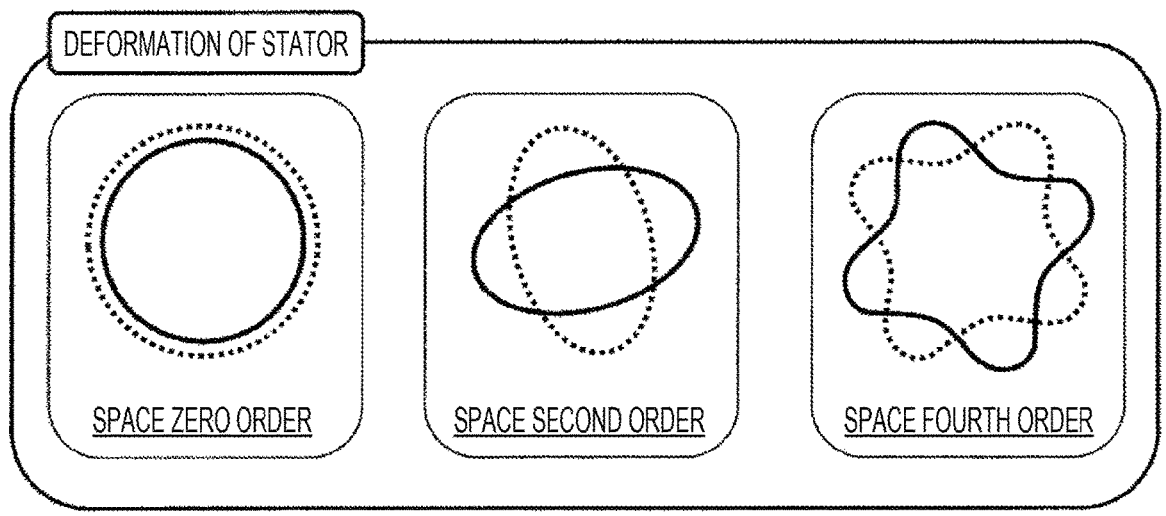
FIG. 3 illustrates an eigenmode of deformation of a motor stator during motor vibration.

FIG. 3 illustrates the eigenmode of deformation of the motor stator during motor vibration.

As illustrated in FIG. 3, the deformation of the motor stator has a plurality of eigenmodes, and has spatial natural vibration states respectively indicated by space orders (for example, space zero order, second order, fourth order, and the like). The smaller the space order, the larger the deformation (easier to vibrate) and the larger the amplitude of the motor vibration.

A natural frequency in the eigenmode in such motor deformation depends on the structure of the housing of the motor. Therefore, the frequency spectrum of the natural frequency does not change even if the motor rotation speed increases with the passage of time. Further, the natural frequency can be measured by an impact test using an impulse hammer or the like.

Figure 4:
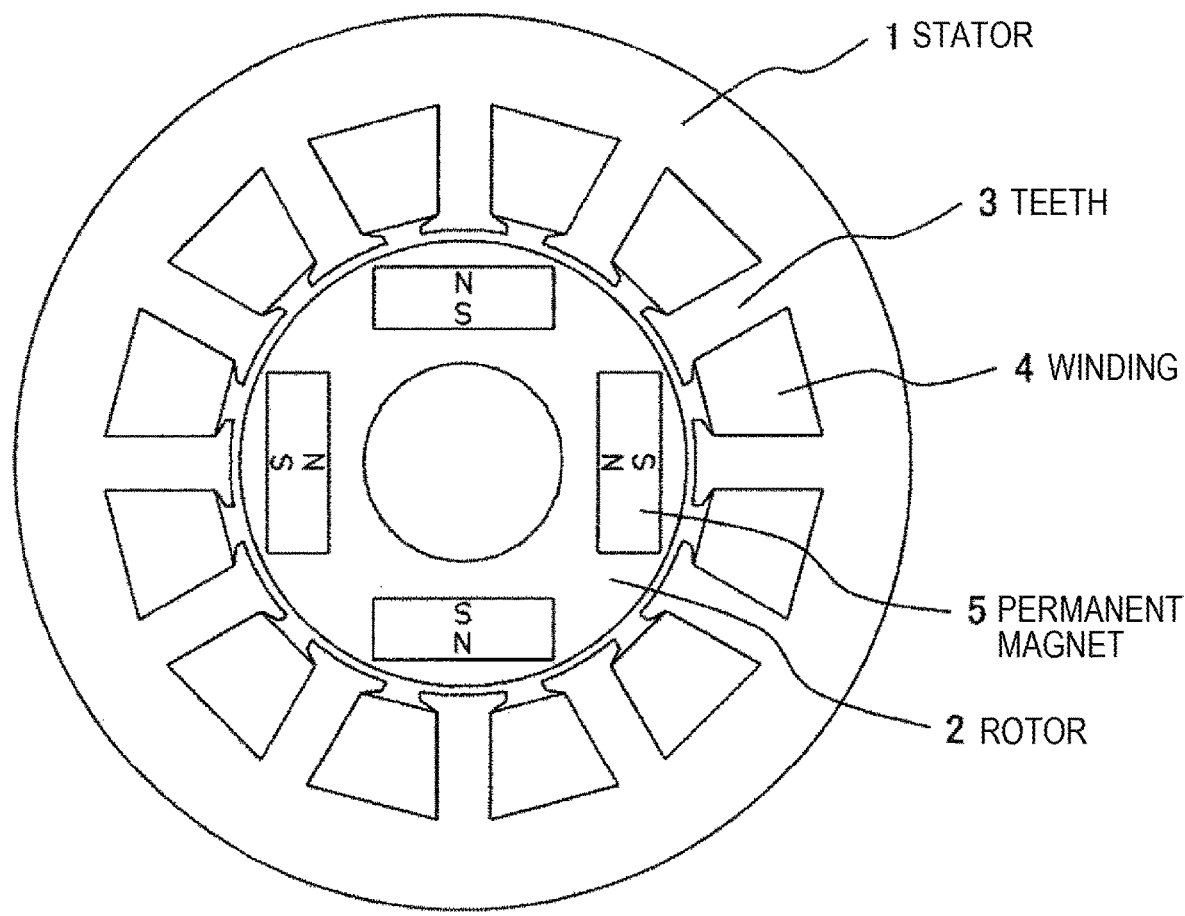
FIG. 4 is a cross-sectional view illustrating a structure of a motor used in the present embodiment.

(2) The Frequency of the Electromagnetic Exciting Force Peculiar to the Motor Structure System FIG. 4 is a cross-sectional view illustrating a structure of the motor used in the present embodiment. Note that the illustrated motor is a so-called embedded magnet motor.

As illustrated in FIG. 4, a stator 1 and a rotor 2 face each other with a predetermined gap therebetween. A winding 4 is wound around teeth 3 of the stator 1. A permanent magnet 5 is provided in the rotor 2. When a three-phase alternating current flows through the winding 4 and a rotating magnetic field is generated, the rotor 2 rotates by interaction between a magnetic flux of the permanent magnet 5 and the rotating magnetic field.

The frequency of the electromagnetic exciting force peculiar to the motor structure system is caused by the motor structure system and depends on the number of stator slots (spaces between the teeth where the windings are located), the number of poles of the rotor magnets, and the like. In the motor illustrated in FIG. 4, the number of slots is twelve and the number of poles is four (the number of pole pairs is two). Therefore, while the rotor 2 mechanically rotates once, the magnetic pole passes through the front of the teeth per phase of the three-phase alternating current four times. Correspondingly, electromagnetic force acting on the rotor 2 changes four times. Therefore, for three phases, the electromagnetic force changes twelve times. Due to such variation of the electromagnetic force, mechanical vibration occurs in the motor.

The frequency of the electromagnetic exciting force peculiar to the motor structure system is expressed by a time (rotation) order according to temporal change of the electromagnetic force as described above. In the case of the motor illustrated in FIG. 4, the electromagnetic exciting force having the time (rotation) orders of 12th, 24th, and the like is generated.

As can be seen from the change of the electromagnetic force as described above, the frequency of the electromagnetic exciting force peculiar to the motor structure system depends not only on the motor structure such as the number of magnetic poles of the rotor and the number of slots of the stator but also on the motor rotation speed. Therefore, even in the same motor, the frequency of the electromagnetic exciting force peculiar to the motor structure system becomes higher as the motor rotation speed becomes higher.

(3) The Electromagnetic Exciting Force Caused by the Carrier

The electromagnetic exciting force caused by the carrier is generated by interaction between a current harmonic and a rotating magnetic field. Therefore, the frequency of the electromagnetic exciting force caused by the carrier depends on the carrier frequency, a sideband wave of the carrier frequency, and the motor rotation speed. Therefore, the frequency of the electromagnetic exciting force caused by the carrier changes to radially spread around the carrier frequency when the motor rotation speed becomes high, and approaches the carrier frequency when the motor rotation speed becomes low, in a case where the carrier frequency is constant.

Therefore, the relationship among the carrier frequency, the sideband wave of the carrier frequency, and the motor rotation speed will be described with reference to FIGS. 5*a* and 5*b* and FIG. 6.

Figure 5A:
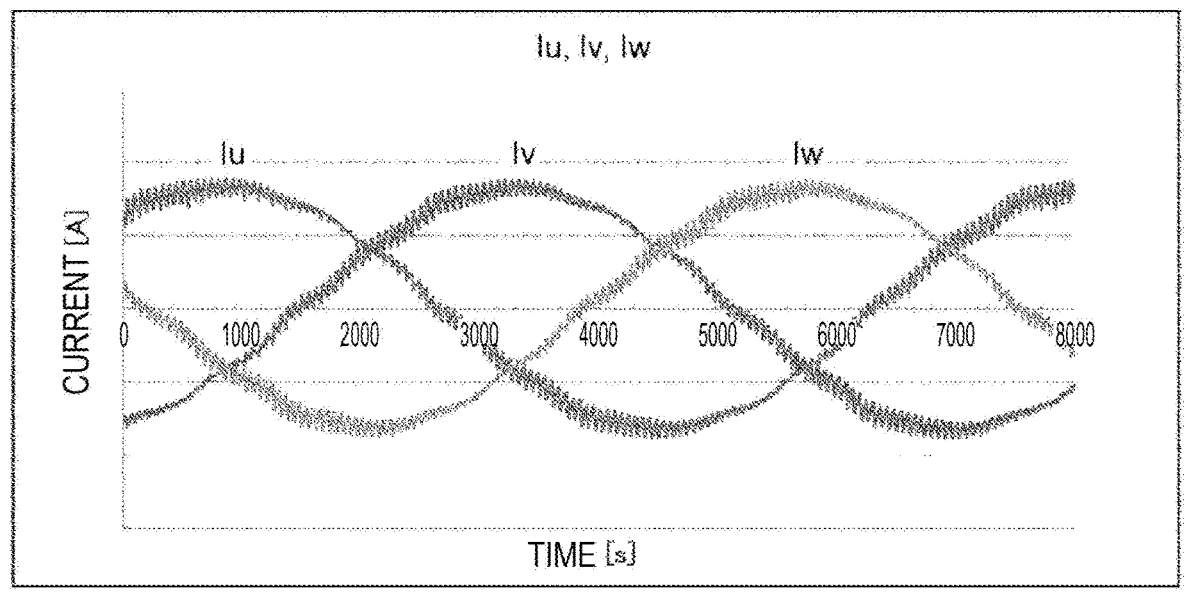
FIG. 5A illustrates waveforms of three-phase currents during motor driving in the present embodiment.

FIG. 5*a* illustrates waveforms of three-phase currents during motor driving in the present embodiment. The horizontal axis and the vertical axis represent the time and the current, respectively.

As illustrated in FIG. 5*a*, in the currents of the phases, carrier-derived frequency components are superimposed on a fundamental frequency (current frequency) component.

Figure 5B:
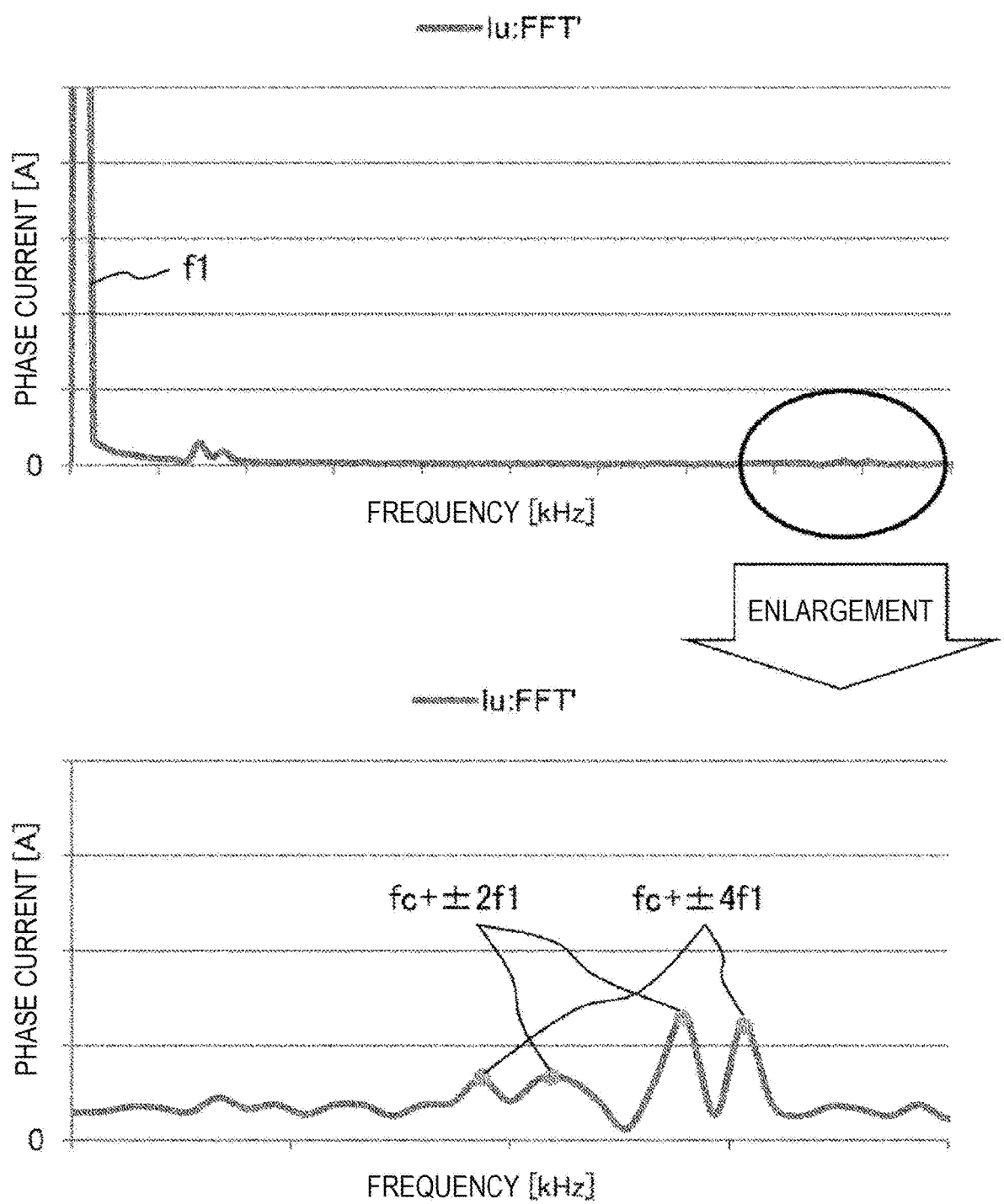
FIG. 5B illustrates a frequency spectrum of a phase current.

FIG. 5*b* illustrates a frequency spectrum of a phase current illustrated in FIG. 5*a*. The horizontal axis and the vertical axis represent the frequency and the current, respectively. Note that FIG. 5*b* illustrates a result of analyzing the U-phase current by fast Fourier transform.

As illustrated in FIG. 5*b*, a fundamental wave frequency component (f1) and sideband waves (fc±2f1 and fc±4f1) of the carrier frequency (fc) appear in the frequency spectrum of the phase current in the present embodiment.

Generally, it is known that, in the PWM inverter, the frequency component of the fundamental wave and the sideband waves of the carrier frequency (frequencies: fc±2f1 and fc±4f1, or the like) appear (fc: the carrier frequency and f1: the fundamental frequency (current frequency)) when a Fourier analysis is performed for a motor phase current (or a line voltage) in a sine wave modulated signal. Therefore, as illustrated in FIG. 5b, a similar analysis result is obtained in the present embodiment.

FIG. 6 illustrates a relationship between frequency components of the motor phase current and the motor rotation speed, as illustrated in FIGS. 5a and 5b. The horizontal axis and the vertical axis represent the frequency and the motor rotation speed, respectively. In FIG. 6, fc is the carrier frequency and f1 is the current frequency. Further, fc±2f1 and fc±4f1 are the frequencies of the sideband waves (current harmonics) and f1 is the current frequency during motor driving.

Since the current frequency f1 changes according to the motor rotation speed, the frequencies (fc±2f1 and fc±4f1) of the sideband waves exhibit change to radially spread around the carrier frequency (fc), as illustrated in FIG. 6. Therefore, the frequencies (fc±2f1 and fc±4f1) of the sideband waves radially increase and decrease around a carrier frequency fc_1 set in the inverter when the motor rotation speed becomes high, that is, when the current frequency f1 becomes high, and the frequencies (fc±2f1 and fc±4f1) of the sideband waves approach the carrier frequency fc_1 when the motor rotation speed becomes low, that is, when the current frequency f1 becomes low.

Note that, in a case of changing the carrier frequency during inverter operation, sideband waves changing similarly to FIG. 6 with respect to f1 appear around the carrier frequency after the change.

When two or three causes out of the above causes (1) to (3) overlap, the sound and vibration generated by the motor become large. Among the causes (1) to (3), a case where (1) and (3) overlap will be taken into consideration in the present embodiment.

According to the study of the present inventor, the sound and vibration generated by the motor strongly appear when the natural frequency in the eigenmode peculiar to the motor structure system and the frequency of the electromagnetic exciting force caused by the carrier overlap. Further, according to the study of the present inventor, the sound and vibration generated by the motor become particularly large in the case where the eigenmode peculiar to the motor structure system is the space zero order and the frequency of the electromagnetic exciting force caused by the carrier is fc±3f1.

Hereinafter, an outline of an analysis in the study by the present inventor as described above will be described.

First, the rotating magnetic field created by the magnet of the rotor is expressed by the expression (1).

$$Brot \cdot \sin(p\theta - \omega 1 \cdot t) \tag{1}$$

In the expression (1), Brot: magnetic flux density, p: a coefficient, θ: a phase, ω1: an angular frequency of the current, and t: time.

The rotating magnetic field of the stator mainly includes a rotating magnetic field by the fundamental wave component of the current flowing through the winding of the stator and a rotating magnetic field by a harmonic component of the current flowing through the stator coil. Therefore, the former is expressed by the expression (2) and the latter is expressed by the expression (3).

$$Bsta \cdot \sin(p\theta - \omega 1 t) \tag{2}$$

In the expression (2), Bsta: magnetic flux density, p: a coefficient, θ: a phase, ω1: an angular frequency of the current, and t: time.

$$Bpwm \cdot \sin\{p\theta + (\omega c + 2\omega 1)t\} + Bpwm \cdot \sin\{p\theta + (\omega c - 4\omega 1)t\} + Bpwm \cdot \sin\{p\theta - (\omega c - 2\theta 1)t\} + Bpwm \cdot \sin\{p\theta - (\omega c + 4\omega 1)t\} \tag{3}$$

In the expression (3), Bpwm: magnetic flux density, p: a coefficient, θ: a phase, ωc: an angular frequency of the carrier, ω1: an angular frequency of the current, and t: time.

As described above (FIG. 5), since the harmonic component of the current flowing through the windings of the stator includes the components (fc±2f1 and fc±4f1) of the sideband waves of the carrier frequency fc, Similar frequency components (ωc±2ω1 and ωc±4ω1 (ωc=2πfc and ω1=2ηf1) exist in the rotating magnetic field by the harmonic component of the current as expressed by the expression (3).

Here, the electromagnetic exciting force in the radial direction is generated by the interaction between the rotating magnetic field by the rotor and the rotating magnetic field by the stator. Therefore, the magnitude of the electromagnetic exciting force is considered to be proportional to {the expression (1)×(the expression (2)+the expression (3))}. Therefore, {the expression (1)×(the expression (2)+the expression (3))} is calculated using the additive theorem of the trigonometric function (sin α·sin β=−(½)·(cos(α+β)−cos (α−β))), the sum of the expressions (4) to (8) is obtained.

$$Brot \cdot Bsta \times (-(½) \cdot \cos(2p\theta - 2\omega 1 t) + (½)) \tag{4}$$

$$Brot \cdot Bpwm \times (-(½) \cdot \cos(2p\theta + (\omega c + \omega 1)t) + (½) \cdot \cos(0\theta - (\omega c + 3\omega 1)t)) \tag{5}$$

$$Brot \cdot Bpwm \times (-(½) \cdot \cos(2p\theta + (\omega c - 5\omega 1)t) + (½) \cdot \cos(0\theta - (\omega c - 3\omega 1)t)) \tag{6}$$

$$Brot \cdot Bpwm \times (-(½) \cdot \cos(2p\theta - (\omega c - \omega 1)t) + (½) \cdot \cos(0\theta + (\omega c - 3\omega 1)t)) \tag{7}$$

$$Brot \cdot Bpwm \times (-(½) \cdot \cos(2p\theta - (\omega c + 5\omega 1)t) + (½) \cdot \cos(0\theta + (\omega c + 3\omega 1)t)) \tag{8}$$

Focusing on the above expressions (5) to (8), it is found that a component in which the angle is expressed by the expression (9) is included.

$$0\theta \pm 2\pi(\omega c \pm 3\omega 1)t \tag{9 arbitrarily combined}$$

In the expression (9), "0θ" corresponds to a space zero-order mode deformation and "ωc±3ω1" is considered to have a component corresponding to the frequency "fc±3f1" (ωc=2πfc and ω1=2πf1). That is, in the case where the frequency of the electromagnetic exciting force is "fc±3f1", it is estimated that the space zero-order mode occurs.

In the above expressions (5) to (8), "2pθ" corresponds to a higher order-mode deformation than the space zero-order mode, and the frequencies of the current harmonic (the sideband waves of the carrier frequency) at this time are considered to be "fc±f1" and "fc±5f1". According to the study of the present inventor, the sound and vibration due to these higher order-mode deformations are less likely to occur by the exciting force due to the current harmonic, and thus are smaller than those in the space zero-order mode.

When two or three causes out of the above causes (1) to (3) overlap, the sound and vibration generated by the motor become large. Therefore, in the present embodiment, in particular, means for reducing the sound and vibration by drive control of the motor is taken in the case where the causes (1) and (3) overlap. Hereinafter, the present means will be described. First, the sound and vibration becoming large as the frequencies in the cases (1) and (3) overlap will be described.

FIG. 7 illustrates a state in which the vibration frequency peculiar to the motor structure and the frequency of the electromagnetic exciting force created by the current harmonic (the sideband wave of the carrier frequency) and the rotating magnetic field of the motor overlap.

In FIG. 7, fc, fc±f1, fc±2f1, and fc±3f1 are frequency components of the electromagnetic exciting force generated by the rotating magnetic field and the current harmonics. Further, f0 is the natural frequency in the eigenmode (space zero order) peculiar to the motor structure system.

Further, in FIG. 7, the rotation orders of the electromagnetic exciting force (rotation Nth order and rotation 2Nth order) are the electromagnetic exciting frequencies peculiar to the motor structure system and depend on the number of slots, the number of magnets, and the like, as described above. Further, the electromagnetic exciting frequency depends on the motor rotation speed, and becomes low when the motor rotation speed is low and becomes high when the motor rotation speed is high.

As described above, the electromagnetic exciting force generated by the rotating magnetic field and the current harmonics (fc±4f1 and fc±2f1) has a frequency component having relatively large vibration, which is the frequency fc±3f1 in the space zero-order eigenmode. FIG. 7 illustrates that the frequencies fc−3f1 and f0 coincide with each other at the rotation speed at a point P_1. That is, in a case where the motor is driven at the carrier frequency fc_1, if the rotation frequency f1 is a value at the point P_1, the vibration frequency (f0) peculiar to the motor structure and the electromagnetic exciting force caused by the current harmonic and the rotating magnetic field of the motor (fc−3f1) coincide with each other. In such a motor rotation speed region near the point P_1, overlap of frequencies is likely to occur, and the sound and vibration become large accordingly.

In a case where frequencies overlap in the human audible range (20 Hz to 20 kHz), the comfortability of passengers decreases especially in a rotation speed range (FTP 75 mode: about 1000 to 5000 r/min), which is frequently used.

In FIG. 7, at the point P_1, the electromagnetic exciting frequency peculiar to the motor structure system in the rotation 2N order also coincides with f0. In this case, the sound and vibration become remarkably large.

In the present embodiment, the sound and vibration of the motor are reduced by suppressing the overlap of the vibration frequency peculiar to the motor structure and the frequency of the electromagnetic exciting force caused by the current harmonic and the rotating magnetic field of the motor, as described above. Hereinafter, means for reducing sound and vibration of the motor in the present embodiment will be described.

FIGS. 8a, 8b, 8c, and 8d illustrate means for reducing sound and vibration of the motor in the present embodiment. Note that, in FIGS. 8a to 8d, similarly to FIG. 7, fc, fc±f1, fc±2f1, and fc±3f1 are frequency components of the electromagnetic exciting force generated by the rotating magnetic field and the current harmonics, f0 is the natural frequency in the eigenmode (space zero order) peculiar to the motor structure system, and the rotation orders of the electromagnetic exciting force (rotation Nth order and rotation 2Nth order) are the electromagnetic exciting frequencies peculiar to the motor structure system.

In each of the means illustrated in FIGS. 8a, 8b, 8c, and 8d, whether the frequency fc±3f1 of the electromagnetic exciting force generated by the rotating magnetic field and the current harmonic coincides with the frequency f0 in the eigenmode having the space order of 0 order is determined by the arithmetic control device (INV200 in FIG. 1). When it is determined that fc±3f1 coincides with f0, a value of the carrier frequency fc is switched from a first value to a second value. Here, f0 is measured by an impact test or the like, and a measured value is set in the arithmetic control device in advance. Note that the rotation frequency f1 is calculated by the arithmetic control device on the basis of the rotation angle of the rotor of the motor detected by the rotation angle sensor (R140 in FIG. 1).

In a case where PWM is applied as the motor control method, the data sampling number is favorably 10 sampling or more to obtain an appropriate current control response. Therefore, maintaining the relationship of fc/f1>10 is favorable before and after the switching of the carrier frequency. Further, the carrier frequency is set to a value different from the vibration frequency peculiar to the motor structure, and is favorably set to a separated value. As a result, fc±3f1 and f0 become close again after the switching of the carrier frequency, whereby an increase in the sound and vibration of the motor can be suppressed.

Note that a power loss generated by the power semiconductor switching elements in the power module INV400 (FIG. 1) increases when the carrier frequency becomes high, so it is favorable to set the carrier frequency in consideration of the power loss and heat generation accompanying the power loss.

Hereinafter, individual means will be described.

Figure 8A:
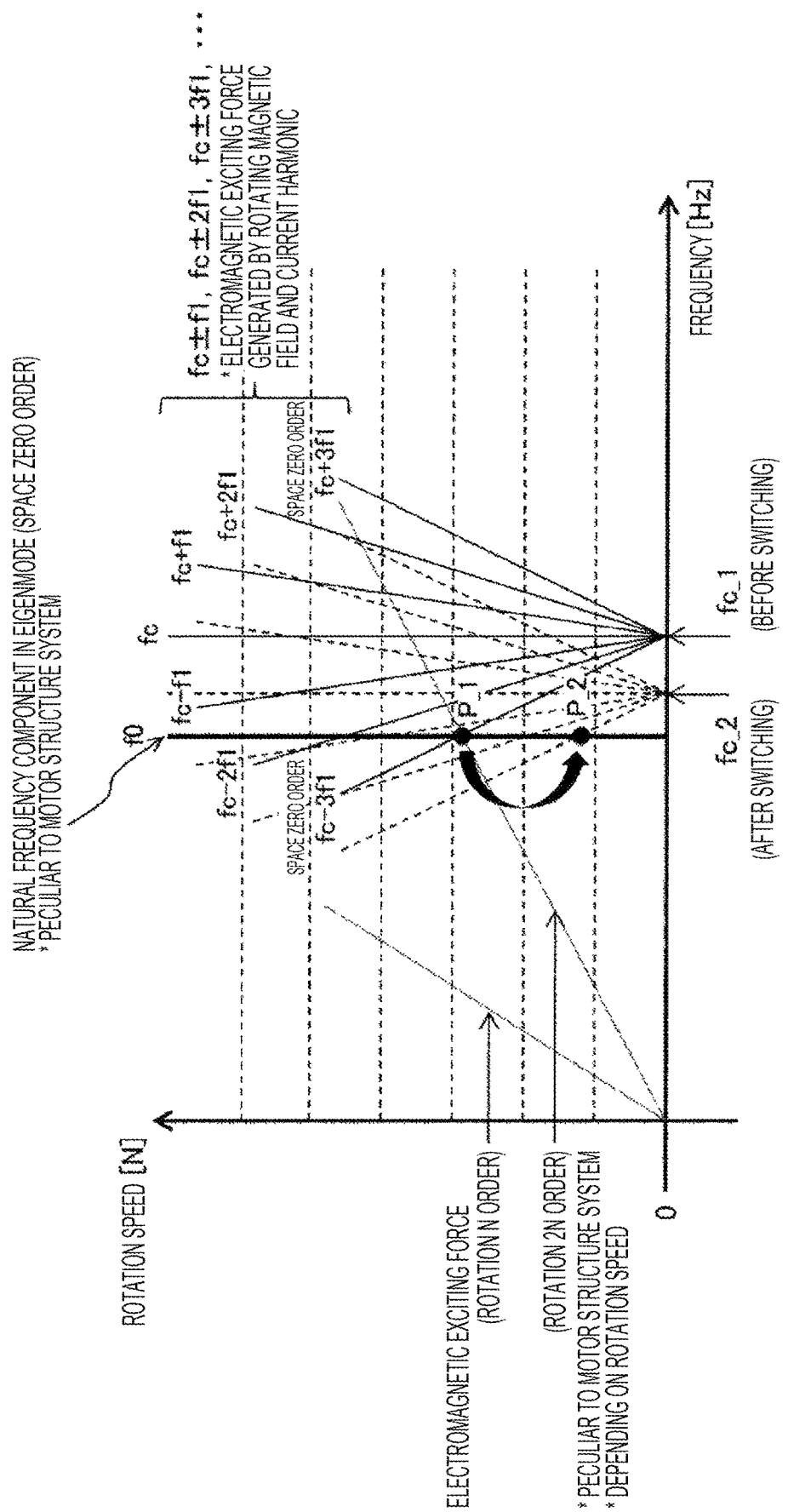
FIG. 8A illustrates means for reducing sound and vibration of the motor in the present embodiment.

In the means illustrated in FIG. 8a, at a higher-frequency side than the natural vibration frequency peculiar to the motor structure system, the carrier frequency is switched to move the overlap of the natural frequency and the frequency of the electromagnetic exciting force caused by the carrier to a low-speed rotation side.

When the motor is driven and controlled at the carrier frequency fc_1 that is a higher frequency than the natural vibration frequency f0, as illustrated in FIG. 8a, the vibration frequency f0 peculiar to the motor structure and the frequency fc−3f1 (fc=fc_1) of the electromagnetic exciting force caused by the current harmonic (the sideband wave of the carrier frequency) and the rotating magnetic field of the motor coincide with each other at the point P_1. At this time, the sound and vibration of the motor become large in the vicinity of the point P_1.

Here, the carrier frequency is switched from fc_1 to fc_2 that is higher than f0 and lower than fc_1. As a result, the point at which the natural vibration frequency f0 and the frequency fc−3f1 of the electromagnetic exciting force created by the current harmonic (the sideband wave of the carrier frequency) and the rotating magnetic field of the motor coincide with each other is moved from P_1 to the point P_2 where the motor rotation speed becomes lower than P_1.

By switching the carrier frequency from fc_1 to fc_2, the overlap of the natural frequency peculiar to the motor structure system and the frequency of the electromagnetic exciting frequency caused by the carrier, that is, the region where the sound and vibration become large, is moved to the low-speed rotation side. Therefore, by controlling the motor at the carrier frequency fc_2, the sound and vibration generated by the motor can be made low even if the motor rotation speed is set to a middle to high-speed rotation region.

Note that, at the point P_1 in FIG. 8a, the electromagnetic exciting frequency peculiar to the motor structure system in the rotation 2N order also coincides with f0. In this case, the sound and vibration of the motor remarkably become large. Therefore, by switching the carrier frequency, the region where the natural vibration frequency, the frequency of the electromagnetic exciting force caused by the carrier, and the electromagnetic exciting frequency peculiar to the motor structure system overlap with one another is moved to the low-speed rotation side. Therefore, the sound and vibration can be significantly reduced.

Figure 8B:
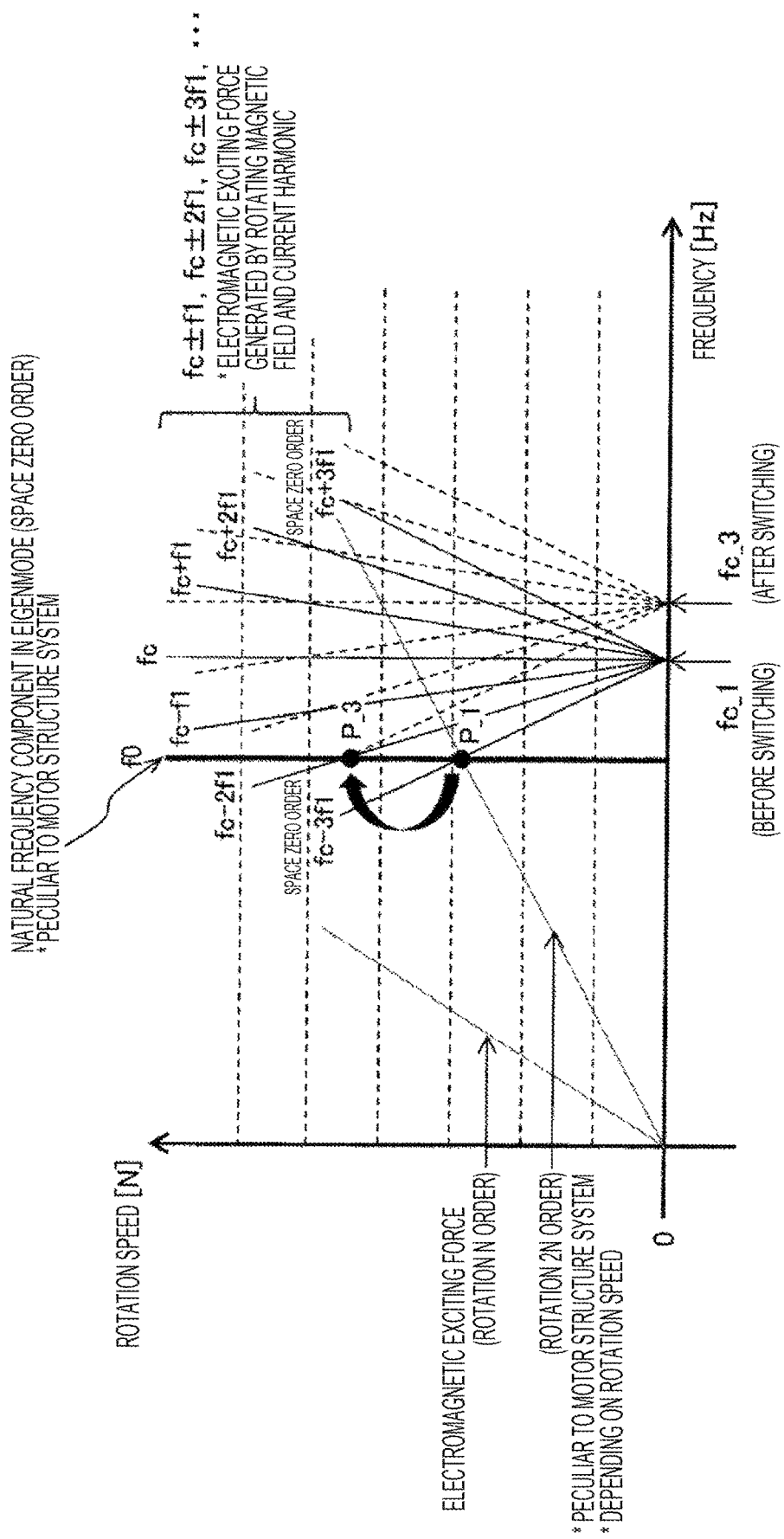
FIG. 8B illustrates means for reducing sound and vibration of the motor in the present embodiment.

Next, in the means illustrated in FIG. 8b, at a higher-frequency side than the natural vibration frequency peculiar to the motor structure system, the carrier frequency is switched to move the overlap of the natural frequency and the frequency of the electromagnetic exciting force caused by the carrier to a high-speed rotation side.

When the motor is driven and controlled at the carrier frequency fc_1 that is a higher frequency than the natural frequency f0, as illustrated in FIG. 8b, the vibration frequency f0 peculiar to the motor structure and the frequency fc−3f1 (fc=fc_1) of the electromagnetic exciting force caused by the current harmonic (the sideband wave of the carrier frequency) and the rotating magnetic field of the motor coincide with each other at the point P_1. At this time, the sound and vibration of the motor become large in the vicinity of the point P_1.

Here, the carrier frequency is switched from fc_1 to fc_3 that is higher than f0 and higher than fc_1. As a result, the point at which the natural vibration frequency f0 and the frequency fc−3f1 of the electromagnetic exciting force created by the current harmonic (the sideband wave of the carrier frequency) and the rotating magnetic field of the motor coincide with each other is moved from P_1 to the point P_3 where the motor rotation speed becomes higher than P_1.

By switching the carrier frequency from fc_1 to fc_3, the overlap of the natural frequency peculiar to the motor structure system and the frequency of the electromagnetic exciting frequency caused by the carrier, that is, the region where the sound and vibration become large, is moved to the high-speed rotation side. Therefore, by controlling the motor at the carrier frequency fc_3, the sound and vibration generated by the motor can be made low even if the motor rotation speed is set to a low to middle rotation speed region.

Note that, at the point P_1 in FIG. 8b, the electromagnetic exciting frequency peculiar to the motor structure system in the rotation 2N order also coincides with f0. In this case, the sound and vibration of the motor remarkably become large. Therefore, by switching the carrier frequency, the region where the natural vibration frequency, the frequency of the electromagnetic exciting force caused by the carrier, and the electromagnetic exciting frequency peculiar to the motor structure system overlap with one another is moved to the high-speed rotation side. Therefore, the sound and vibration can be significantly reduced.

Figure 8C:
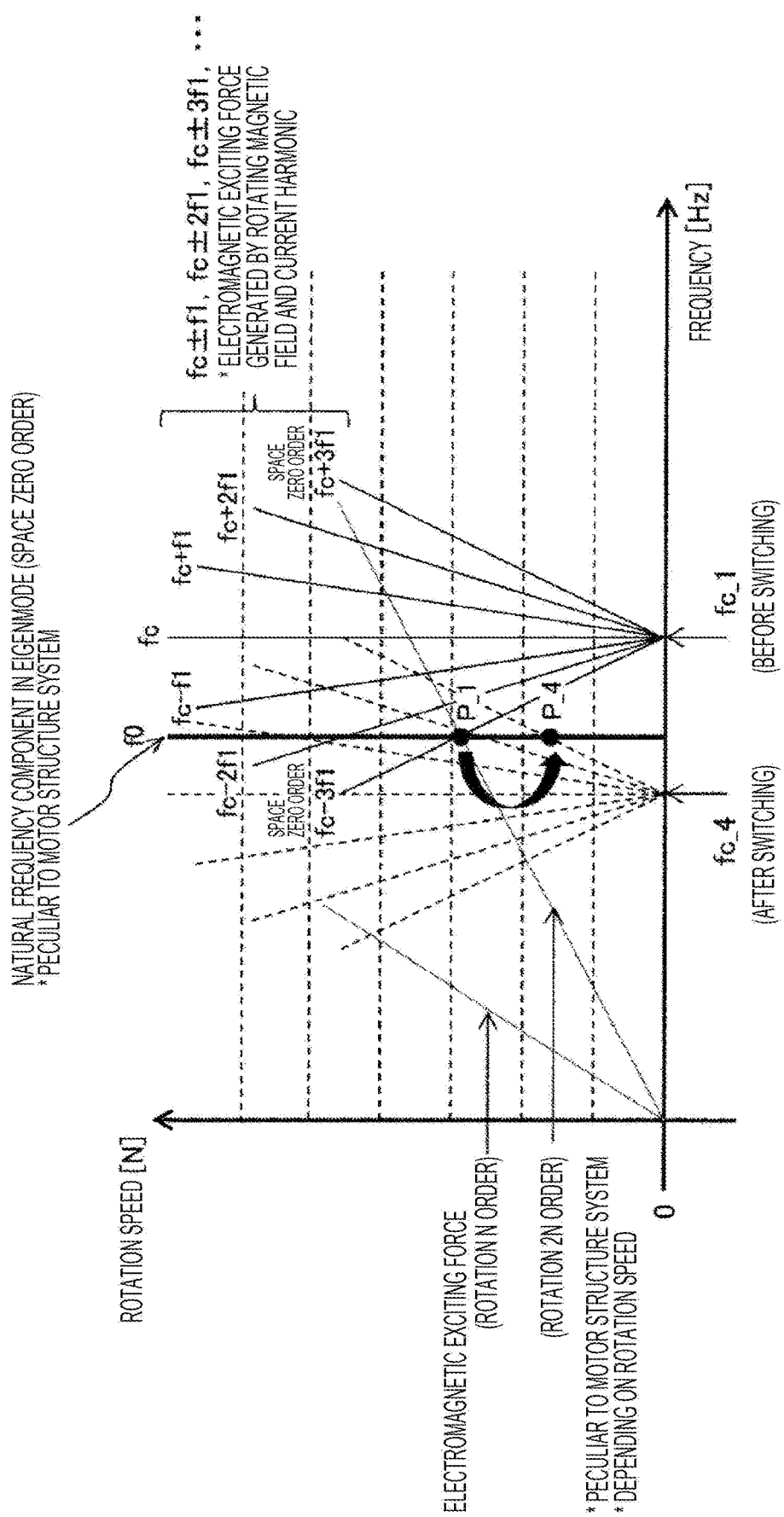
FIG. 8C illustrates means for reducing sound and vibration of the motor in the present embodiment.

Next, in the means illustrated in FIG. 8c, the carrier frequency is switched to move the overlap of the natural vibration frequency and the frequency of the electromagnetic exciting force caused by the carrier to a low-speed rotation side, similarly to the means in FIG. 8a, but the carrier frequency after the switching is set to a lower frequency than the natural vibration frequency, unlike the means in FIG. 8a.

When the motor is driven and controlled at the carrier frequency fc_1 that is a higher frequency than the natural vibration frequency f0, as illustrated in FIG. 8c, the vibration frequency f0 peculiar to the motor structure and the frequency fc−3f1 (fc=fc_1) of the electromagnetic exciting force caused by the current harmonic (the sideband wave of the carrier frequency) and the rotating magnetic field of the motor coincide with each other at the point P_1. At this time, the sound and vibration of the motor become large in the vicinity of the point P_1.

Here, the carrier frequency is switched from fc_1 to fc_4 that is lower than f0. In this case, the point P_2 at which the natural vibration frequency f0 and the frequency fc+3f1 of the electromagnetic exciting force created by the current harmonic (the sideband wave of the carrier frequency) and the rotating magnetic field of the motor coincide with each other is located to a lower speed side of the motor rotation speed than P_1.

By switching the carrier frequency from fc_1 to fc_4, the overlap of the natural vibration frequency peculiar to the motor structure system and the frequency of the electromagnetic exciting frequency caused by the carrier, that is, the region where the sound and vibration become large, is moved to the low-speed rotation side. Therefore, by controlling the motor at the carrier frequency fc_4, the sound and vibration generated by the motor can be made low even if the motor rotation speed is set to a middle to high-speed rotation region.

Note that, at the point P_1 in FIG. 8c, the electromagnetic exciting frequency peculiar to the motor structure system in the rotation 2N order also coincides with f0. In this case, the sound and vibration of the motor remarkably become large. Therefore, by switching the carrier frequency, the region where the natural vibration frequency, the frequency of the electromagnetic exciting force caused by the carrier, and the electromagnetic exciting frequency peculiar to the motor structure system overlap with one another is moved to the low-speed rotation side. Therefore, the sound and vibration can be significantly reduced.

Next, in the means illustrated in FIG. 8d, the carrier frequency after switching is set to a lower frequency than the natural vibration frequency, similarly to the means in FIG. 8c, but the carrier frequency is switched to move the overlap of the natural vibration frequency and the frequency of the electromagnetic exciting force caused by the carrier to a high-speed rotation side, unlike the means in FIG. 8c.

When the motor is driven and controlled at the carrier frequency fc_1 that is a higher frequency than the natural vibration frequency f0, as illustrated in FIG. 8d, the vibration frequency f0 peculiar to the motor structure and the frequency fc−3f1 (fc=fc_1) of the electromagnetic exciting force caused by the current harmonic (the sideband wave of the carrier frequency) and the rotating magnetic field of the motor coincide with each other at the point P_1. At this time, the sound and vibration of the motor become large in the vicinity of the point P_1.

Here, the carrier frequency is switched from fc_1 to fc_5 that is lower than f0. In this case, the point P_5 at which the natural vibration frequency f0 and the frequency fc+3f1 of the electromagnetic exciting force created by the current harmonic (the sideband wave of the carrier frequency) and the rotating magnetic field of the motor coincide with each other is located to a higher speed side of the motor rotation speed than P_1. Note that if the values of f0 and fc_1 in FIG. 8c are equal to the values of f0 and fc_1 in FIG. 8d, respectively, fc_5 (FIG. 8d) is a lower frequency than fc_4 (FIG. 8c).

By switching the carrier frequency from fc_1 to fc_5, the overlap of the natural vibration frequency peculiar to the motor structure system and the frequency of the electromagnetic exciting frequency caused by the carrier, that is, the region where the sound and vibration become large, is moved to the high-speed rotation side. Therefore, by controlling the motor at the carrier frequency fc_5, the sound and vibration generated by the motor can be made low even if the motor rotation speed is set to a low to middle rotation speed region.

Note that, at the point P_1 in FIG. 8d, the electromagnetic exciting frequency peculiar to the motor structure system in the rotation 2N order also coincides with f0. In this case, the sound and vibration of the motor remarkably become large. Therefore, by switching the carrier frequency, the region where the natural vibration frequency, the frequency of the electromagnetic exciting force caused by the carrier, and the electromagnetic exciting frequency peculiar to the motor structure system overlap with one another is moved to the low-speed rotation side. Therefore, the sound and vibration can be significantly reduced.

The means described in FIGS. 8a to 8d can be appropriately selected according to the natural vibration frequency, the magnitude of the carrier frequency, and the motor rotation speed to be used. Note that, in the case of switching the carrier frequency to the carrier frequency having a lower frequency than the natural vibration frequency, as illustrated in FIGS. 8c and 8d, the region where the sound and vibration become large can be moved to the region where the motor rotation speed is low and the region where the motor rotation speed is high without increasing the power loss and the heat generation of the inverter device.

As described above, according to the present embodiment, when the motor rotates at the predetermined rotation frequency f1, the carrier frequency is switched to move the region where the vibration frequency f0 in the space zero-order eigenmode and the frequency component fc±3f1 of the electromagnetic exciting force overlap with each other to the region where the motor rotation speed is low or to the region where the motor rotation speed is high. As a result, the sound and vibration generated by the motor can be reduced.

Further, according to the present embodiment, the carrier frequencies before and after the switching are set according to an estimable or measurable vibration frequency f0 in the space 0-order eigenmode, whereby motor control to reliably reduce the sound and vibration generated by the motor can be realized. Therefore, it is not necessary to perform complicated examination, such as prototyping a motor drive system, evaluating sound and vibration, and adjusting the configuration of the motor drive system on the basis of an evaluation result.

Further, according to the present embodiment, design consideration with a high degree of freedom, such as preferentially performing countermeasures for reduction of the sound and vibration in the motor rotation speed region with a high frequency of use (for example, in accordance with a specified traveling mode), becomes possible.

Note that the present invention is not limited to the above-described embodiments and includes various modifications. For example, the above-described embodiments have been described in detail for describing the present invention in an easy-to-understand manner, and the present invention is not necessarily limited to one including all the described configurations. Further, another configuration can be added to/deleted from/replaced with a part of a configuration of the embodiments.

REFERENCE SIGNS LIST

VCM100 host controller
INV100 inverter
INV200 arithmetic control device
INV300 drive circuit
INV400 power module
CT100 current sensor
TS100 temperature sensor
MG100 motor
C110 U-phase coil winding
C120 V-phase coil winding
C130 W-phase coil winding
N100 neutral point
R140 rotation angle sensor
1 stator
2 rotor
3 teeth
4 winding
5 permanent magnet

The invention claimed is:

1. A rotary electric motor control method for controlling a rotary electric motor by PWM at a predetermined carrier frequency, the method comprising:
in a case where a vibration frequency in a space zero-order eigenmode of the rotary electric motor and a frequency of a frequency component of electromagnetic exciting force that generates the eigenmode overlap with each other, switching a value of the carrier frequency from a first value to a second value different from the first value.

2. The rotary electric motor control method according to claim 1, wherein
the frequency of a frequency component of electromagnetic exciting force is fc±3f1, where the carrier frequency is fc and a rotation frequency of the rotary electric motor is f1.

3. The rotary electric motor control method according to claim 1, wherein,
in the case where a vibration frequency in a space zero-order eigenmode of the rotary electric motor and a frequency of a frequency component of electromagnetic exciting force that generates the eigenmode overlap with each other, a value of a rotation frequency for the second value is lower than a value of a rotation frequency for the first value.

4. The rotary electric motor control method according to claim 3, wherein
the first value is higher than the vibration frequency in the eigenmode, and
the second value is lower than the first value and is higher than the vibration frequency in the eigenmode.

5. The rotary electric motor control method according to claim 3, wherein
the first value is higher than the vibration frequency in the eigenmode, and
the second value is lower than the first value and is lower than the vibration frequency in the eigenmode.

6. The rotary electric motor control method according to claim 1, wherein,
in the case where a vibration frequency in a space zero-order eigenmode of the rotary electric motor and a frequency of a frequency component of electromagnetic exciting force that generates the eigenmode overlap with each other, a value of a rotation frequency for the second value is higher than a value of a rotation frequency for the first value.

7. The rotary electric motor control method according to claim 6, wherein the first value is higher than the vibration frequency in the eigenmode, and the second value is higher than the first value.

8. The rotary electric motor control method according to claim 6, wherein the first value is higher than the vibration frequency in the eigenmode, and the second value is lower than the first value and is lower than the vibration frequency in the eigenmode.

9. A rotary electric motor control device for controlling a rotary electric motor by PWM at a predetermined carrier frequency, the device comprising:

a power module configured to output three-phase alternating current power for driving the rotary electric motor by ON/OFF of a semiconductor switching element;

a drive circuit configured to create a PWM gate pulse for turning ON/OFF the semiconductor switching element; and an arithmetic control device configured to create a gate drive signal commanding creation of the PWM gate pulse to the drive circuit by PWM with the predetermined carrier frequency, wherein the arithmetic control device determines whether a vibration frequency in a space zero-order eigenmode of the rotary electric motor and a frequency of a frequency component of electromagnetic exciting force that generates the eigenmode overlap with each other, and switches a value of the carrier frequency from a first value to a second value different from the first value in a case where the overlap is determined.

10. A rotary electric motor drive system comprising:

a rotary electric motor; and an inverter configured to drive the rotary electric motor, wherein the inverter consists of the rotary electric motor control device according to claim 9.

* * * * *